REISSUED
AS NO. 15404
JUL 1 192

N. CHAPDELAINE.
TOY.
APPLICATION FILED MAR. 28, 1921.

Reissued July 12, 1921. 15,148.

INVENTOR
Norbert Chapdelaine
BY E. J. Fetherstonhaugh
ATTORNEY

UNITED STATES PATENT OFFICE.

NORBERT CHAPDELAINE, OF MONTREAL, QUEBEC, CANADA, ASSIGNOR, BY MESNE ASSIGNMENTS, TO ALLAN ANGUS MAGEE, OF MONTREAL, QUEBEC, CANADA.

TOY.

15,148. Specification of Reissued Letters Patent. Reissued July 12, 1921.

Original No. 1,335,425, dated March 30, 1920, Serial No. 303,233, filed June 10, 1919. Application for reissue filed March 28, 1921. Serial No. 456,204.

*To all whom it may concern:*

Be it known that I, NORBERT CHAPDELAINE, a subject of the King of Great Britain, and residing at the city of Montreal, in the Province of Quebec, in the Dominion of Canada, have invented a new and useful Toy, of which the following is the specification.

The invention relates to a toy, as described in the present specification and illustrated in the accompanying drawings, that form part of the same.

The invention consists essentially of the novel mounting of a body portion on wheels, whereby the motion and consequent driving of the toy is accomplished by the throw of an eccentric from a pivot point forming the axis of rotation in the swing of the body by the action of an eccentric.

The objects of the invention are to furnish amusement and healthful exercise to the young and at the same time occupy their minds and keep them alert by the necessity of constant driving; to accompany the driving action by a body movement intended to simulate the motion of a horse or other animal; and generally to provide a simple, cheap and useful toy for the amusement of children.

In the accompanying drawings.

Referring to the drawings wherein like and corresponding parts are designated by similar reference characters throughout the several views—

Figure 1:
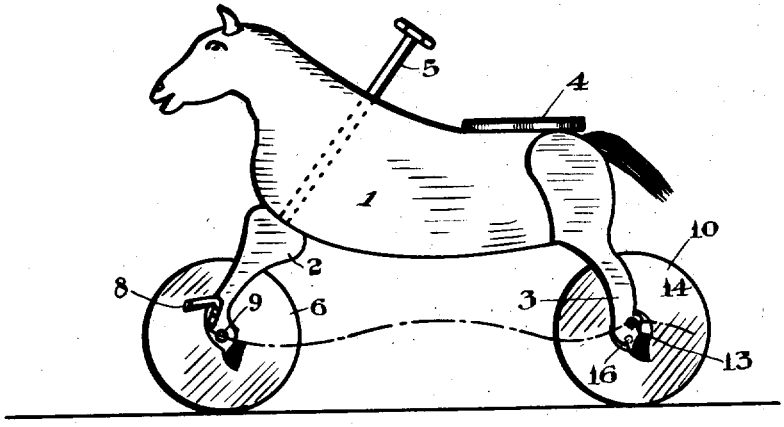
Figure 1 is a side elevation of the toy embodying the present invention.
Figure 2:
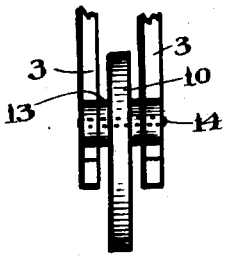
Fig. 2 is a detail rear end elevation of the same.

The body 1 forms the seat supporting member and is preferably made from a board or plate in the shape of a horse having frontwardly projecting legs 2 and rearwardly projecting legs 3, the ends of these legs being the extremities of the horse before and behind the body 1. A seat 4 is secured upon the body of the horse and extending through the body 1 is a suitable steering post 5 which is connected to the front legs 2, whereby they may be turned for guiding the toy over the ground. Journaled within the front legs 2 is a front wheel 6 which is preferably in disk form and secured to each front leg 2 is a foot rest or stirrup preferably made of angle iron as shown, and the tread portion 8 thereof is arranged above and slightly in advance of the axle 9 of this front wheel 6.

Figure 3:
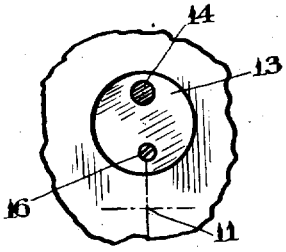
Fig. 3 is a detail view of the rear wheel.
Figure 4:
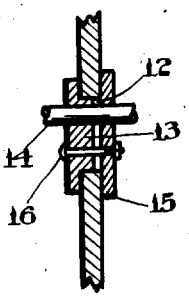
Fig. 4 is a detail section through the same.

The rear wheel 10 is preferably made in disk form and its center point is indicated by the numeral 11 in Fig. 3. This rear wheel or disk 10 is provided with an opening 12 therein which is arranged eccentric to the center point 11 of the wheel. Adapted to be seated within this opening 12 is a block 13 and extending through this block and arranged eccentrically therein is a shaft 14, which connects the wheel 10 with the rear legs 3.

A washer or plate 15 is connected to the block 13 through the bolt 16 whereby this block will be securely retained within the opening 12 and held against motion.

The weighted body is the actuating member therefor, when the child mounts the first movement is to give the toy a slight start by propelling it with the feet in stepping contact with the ground in the same fashion as the old velocipede motion.

As soon as the start has been made the child relaxes at each turn of the rear wheel, so that his whole weight bears on the pivot point forward of the center thereby benefiting by the leverage similar to a pedal motion without using the feet. The child very soon becomes quite proficient and the art of driving is accompanied by a waving or galloping motion as indicated in the dotted line in Fig. 1. To increase or decrease the galloping motion of the horse the block 13 may be moved within the opening 12.

When the block 13 is in the position as shown in Fig. 3, the axle 14 is farther away from the center line 11, thereby giving a greater leverage and galloping motion to the toy, but by loosening the bolt 16 the block 13 may be revolved within the opening 12 thereby bringing the shaft 14 nearer the center 11 whereupon the bolt 16 is again tightened and by thus adjusting this block the galloping motion of the toy may be regulated as desired.

This toy naturally lends itself to many variations in size, shape and general features of construction. Such changes may readily be made without departing from the spirit of the invention so long as the essential feature remains that of leverage member operated by the weight above and swinging from a pivot point in the running gear at a fixed distance from the eccentric.

What I claim is:—

1. In a toy, a body having legs extending frontwardly and rearwardly therefrom, a wheel journaled centrally in relation to its tread between the front legs and forming a pivot for said body and also a steering member, foot rests projecting from and rigid with said front legs, a rear wheel journaled eccentrically in relation to its tread between said rear legs and forming the propulsion member and a seat situated in a forward position in relation to said rear wheel.

2. In a toy, a board cut in the shape of a horse and having a seat secured on the hind quarters, a pair of hind legs rigidly fastened to the board and projecting therebehind and forming the rear extremities, a pair of front legs forming a fork and pivotally secured to the body by a steering post, foot rests secured to said front legs, a wheel front having a central pivot pin journaled in said fork at the extremities of the legs and forming a pivot member for the body, and a rear driving wheel having an eccentrically placed pin journaled in the rear legs at the extremities thereof and situated to the rear of said seat.

3. A toy comprising a body portion having the configuration of a horse, a pair of front legs and foot-rests thereon and pivotally connected thereto, a pair of rear legs rigid therewith, a wheel journaled within said front legs, a rear wheel, a block eccentrically connected within said rear wheel and rear shaft extending through said block and supporting said horse and situated at the rear extremity.

4. A toy of the character described comprising a body portion having the configuration of a horse, a seat mounted upon said body portion, a pair of legs pivotally connected to said body portion, a steering post connected to said legs, a wheel journaled within said legs, foot rests secured to said legs having the treadle portions thereof arranged above and in advance of the center of said wheel, a pair of rear legs rigidly secured to said body portion, a shaft journaled within said rear legs, a rear wheel, a block adjustably and eccentrically secured within said rear wheel, said rear shaft extending through said block and fast therewith.

Signed at Montreal this 23rd day of March 1921.

NORBERT CHAPDELAINE.